(12) United States Patent
Wetherall et al.

(10) Patent No.: US 6,801,503 B1
(45) Date of Patent: Oct. 5, 2004

(54) PROGRESSIVE AND DISTRIBUTED REGULATION OF SELECTED NETWORK TRAFFIC DESTINED FOR A NETWORK NODE

(75) Inventors: David J. Wetherall, Seattle, WA (US); Stefan R. Savage, Seattle, WA (US); Thomas E. Anderson, Seattle, WA (US)

(73) Assignee: Arbor Networks, Inc., Lexington, MA (US)

( * ) Notice: Subject to any disclaimer, the term of this patent is extended or adjusted under 35 U.S.C. 154(b) by 762 days.

(21) Appl. No.: 09/685,518

(22) Filed: Oct. 9, 2000

(51) Int. Cl.[7] ................................................. H04J 3/14
(52) U.S. Cl. ......................... 370/235; 370/253; 709/226
(58) Field of Search ................................. 370/229, 230, 370/230.1, 231, 232, 233, 234, 235, 236, 236.1, 236.2, 241, 241.1, 248, 250, 251, 252, 253; 709/223, 224, 226, 227, 228, 229, 238, 244

(56) References Cited

U.S. PATENT DOCUMENTS

| | | | | | |
|---|---|---|---|---|---|
| 4,991,204 | A | * | 2/1991 | Yamamoto et al. | 379/221.01 |
| 5,289,462 | A | * | 2/1994 | Ahmadi et al. | 370/232 |
| 5,434,848 | A | * | 7/1995 | Chimento et al. | 370/232 |
| 6,130,875 | A | * | 10/2000 | Doshi et al. | 370/225 |
| 6,201,810 | B1 | * | 3/2001 | Masuda et al. | 370/395.32 |
| 6,389,532 | B1 | * | 5/2002 | Gupta et al. | 713/163 |
| 6,437,804 | B1 | * | 8/2002 | Ibe et al. | 345/736 |
| 6,667,956 | B2 | * | 12/2003 | Beshai et al. | 370/238 |

FOREIGN PATENT DOCUMENTS

EP      0 859 491 A      8/1998

OTHER PUBLICATIONS

Iwata, et al., "PNNI Routing Algorithms for Multimedia ATM Internet," NEC Research and Development, vol. 38, No. 1, Jan. 1997, pp. 60–73.

* cited by examiner

*Primary Examiner*—Hassan Kizou
*Assistant Examiner*—Dmitry Levitan
(74) *Attorney, Agent, or Firm*—Houston Eliseeva L.L.P.

(57) ABSTRACT

An apparatus is equipped to receive network traffic data for network traffic routed through a number of routing devices with one or more degrees of separation from a network node. The network traffic data include at least network traffic data for network traffic destined for the network node which meet a traffic type selection criteria and are routed by the routing devices to the network node. The apparatus is further equipped to progressively regulate and de-regulate network traffic routing by the routing devices based at least in part on the received network traffic data and the degrees of separation of the routing devices from the network node. Regulation extends from routing devices with the lowest degree of separation from the network node to routing devices with the highest degree of separation, following in the reverse direction of the routing paths traversed by the packets to reach the network node. In one embodiment, the extension or push back is made one degree of separation at a time. In one embodiment, deregulation follows the reverse path, whereas in another embodiment, deregulation is determined and implemented locally, whenever regulation or the extent of regulation is no longer needed. In one embodiment, regulation is made in accordance with a not-to-exceed profile, and the not-to-exceed limit or limits are divided up as regulation extends away from the network node.

60 Claims, 7 Drawing Sheets

710

| Routing Device ID 712 | IP Addr 713 | Inter-face 714 | Network Node 715 | Regulation on Traffic Type 1 716a | ... | Regulation on Traffic Type n 716n | Other Data 718 |
|---|---|---|---|---|---|---|---|
| | | | | | | | |
| | | | | | | | |
| | | | | | | | |

720

| Server ID 722 | IP Addr 724 | Traffic Type 1 725a | Limit for Traffic Type 1 726a | ... | ... | Traffic Type 2 725n | Limit for Traffic Type n 726n | Other Data 728 |
|---|---|---|---|---|---|---|---|---|
| | | | | | | | | |
| | | | | | | | | |
| | | | | | | | | |

PROGRESSIVE AND DISTRIBUTED REGULATION OF SELECTED NETWORK TRAFFIC DESTINED FOR A NETWORK NODE

BACKGROUND OF THE INVENTION

1. Field of the Invention

The present invention relates to the field of networking. More specifically, the present invention relates to the regulation of routing devices for a network node, including progressive and distributed regulation of selected network traffic destined for the network node.

2. Background Information

With advances in integrated circuit, microprocessor, networking and communication technologies, increasing numbers of devices, in particular, digital computing devices, are being networked together. Devices are often first coupled to a local area network, such as an Ethernet based office/home network. In turn the local area networks are interconnected together through wide area networks, such as asynchronous transfer mode (ATM) networks, Frame Relays, and the like. Of particular interest is the transmission control protocol/internet protocol (TCP/IP) based global inter-networks, Internet.

As a result of this trend of increased connectivity, increasing numbers of applications that are network dependent are being deployed. Examples of these network dependent applications include but are not limited to, email, net based telephony, world wide web and various types of e-commerce. For these applications, success inherently means high volumes of network traffic for their implementing servers. To ensure continuing success, quality of service through orderly and efficient handling of the large volume of network traffic has become of paramount importance. Various subject matters, such as scalability, distributive deployment and caching of contents as well as regulating network traffic destined for a network mode have become of great interest to the artesian.

SUMMARY OF THE INVENTION

The present invention provides for a method and apparatus for regulating network traffic destined for a network node, such as a server, to facilitate ensuring the quality of service provided by the network to the network node and the parties interacting with it, such as a client. More specifically, the present invention provides for a progressive and distributed approach to regulating selected network traffic destined for the network node at those regions of the network where the selected traffic exceeds a desired amount. The present invention may also be used to block selected network traffic destined for a network node, thereby protecting the network node from denial of service attacks.

In accordance with the present invention, an apparatus is equipped to receive network traffic data for network traffic routed through a number of routing devices with one or more degrees of separation from a network node. The routing devices may or may not form a contiguous portion of the network. The network traffic data include at least network traffic data for network traffic destined for the network node which meet a traffic type selection criteria and are routed by the routing devices to the network node. The apparatus is further equipped to progressively regulate and de-regulate network traffic routing by the routing devices based at least in part on the received network traffic data and the degrees of separation of the routing devices from the network node. Regulation extends from routing devices with the lowest degree of separation from the network node to routing devices with the highest degree of separation, following in the reverse direction the routing paths traversed by the packets to reach the network node. In one embodiment, the extension or push back is made one degree of separation at a time. In one embodiment, deregulation follows the reverse path, whereas in another embodiment, deregulation is determined and implemented locally, whenever regulation or the extent of regulation is no longer needed. In one embodiment, regulation is made in accordance with a not-to-exceed profile, and the not-to-exceed limit or limits are divided up as regulation extends away from the network node.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as receiving, analyzing, determining, instructing, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor includes microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. The terms "routing devices" and "route" are used throughout this application, in the claims as well as in the specification. The terms as used herein are intended to be genus terms that include the conventional routers and conventional routing, as well as all other variations of network trafficking, such as, switches or switching, gateways, hubs and the like. Thus, unless particularized, the terms are to be given this broader meaning. Further, the description repeatedly uses the phrase "in one embodiment", which ordinarily does not refer to the same embodiment, although it may.

Overview

Figure 1:
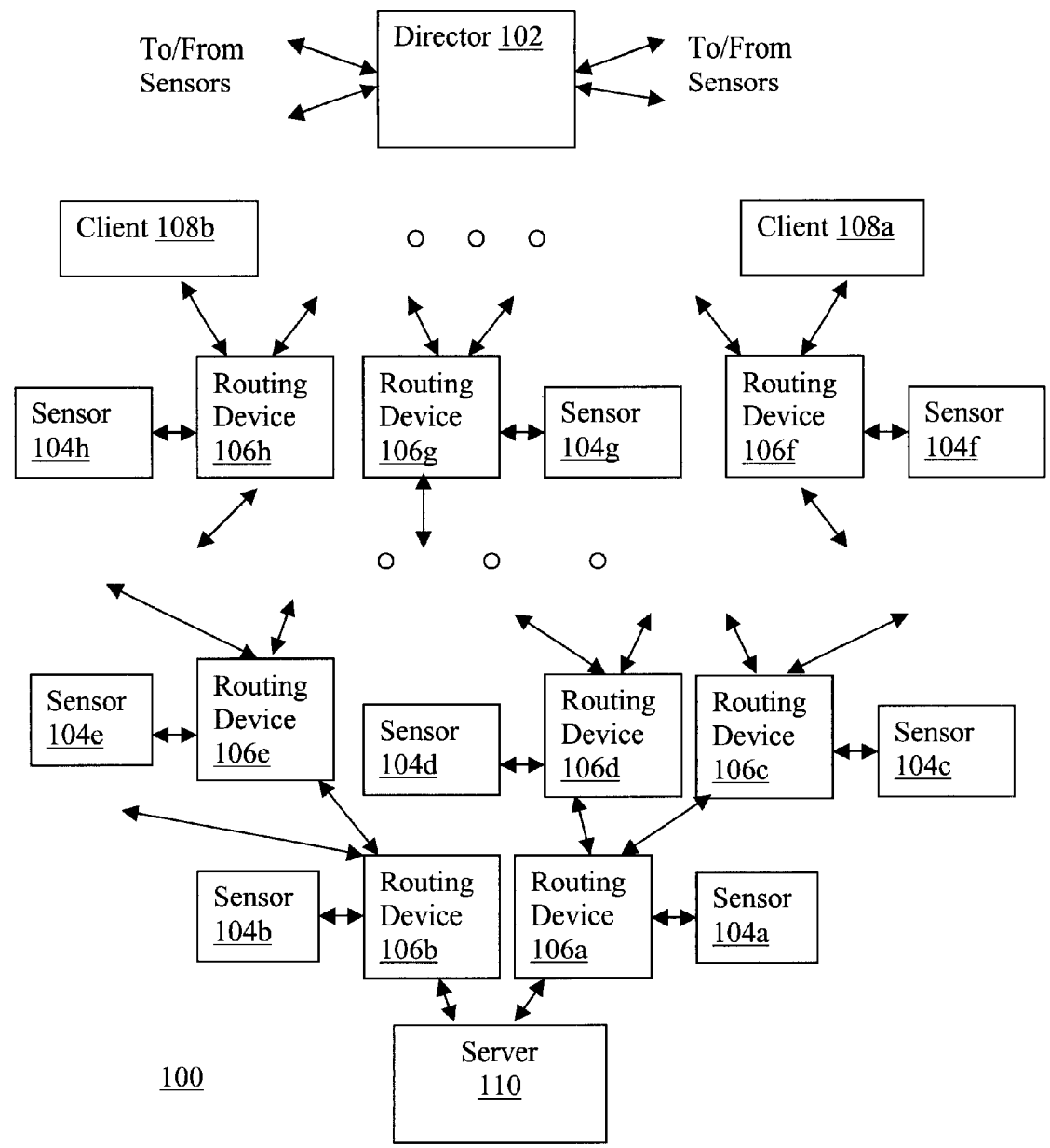
FIG. 1 illustrates a topological view of an example network incorporated with the teachings of the present invention, including a director to regulate network traffics for a network node, in accordance with one embodiment.
Figure 2:
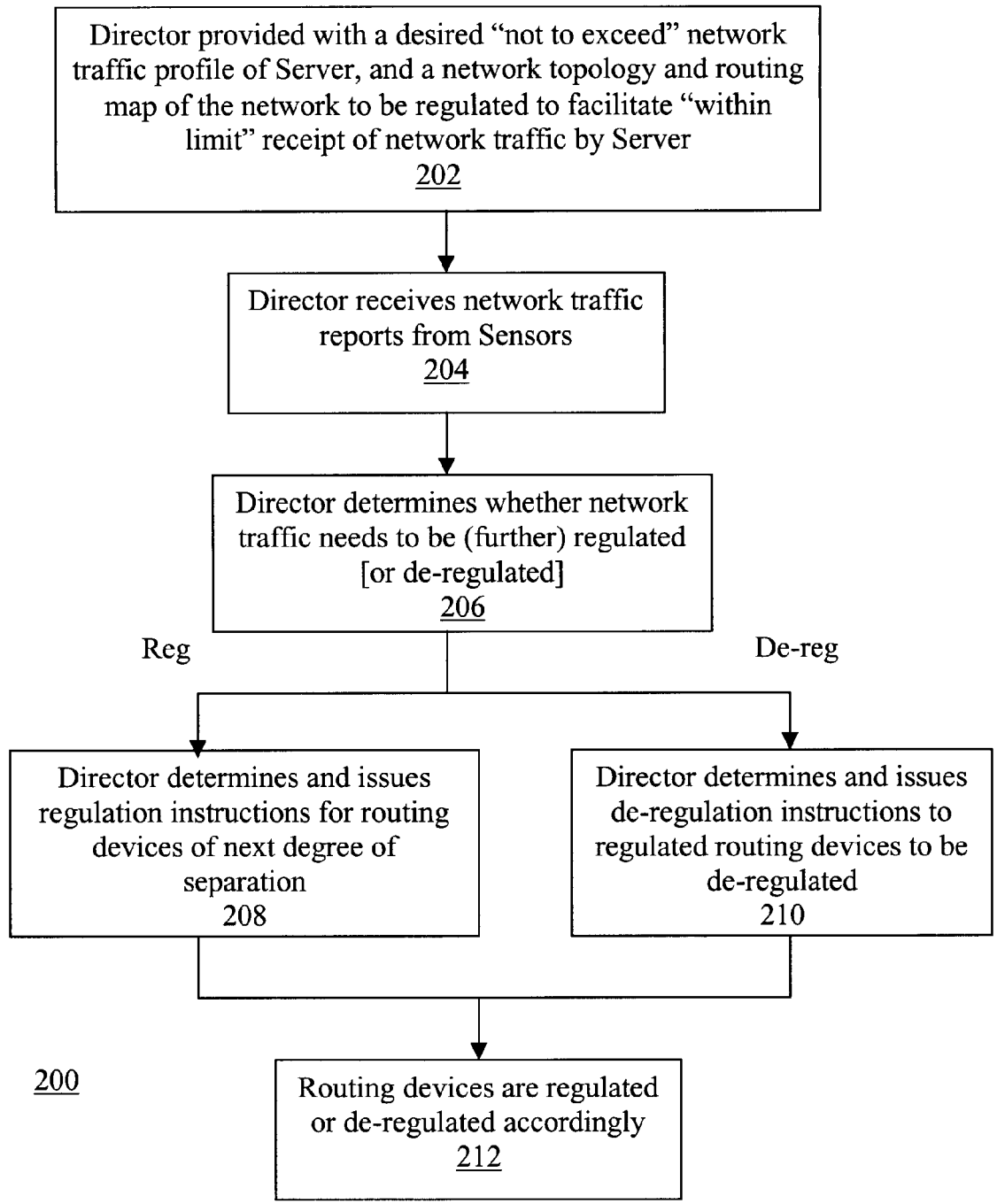
FIG. 2 illustrates a method view of the same invention, in accordance with one embodiment.

Referring now first to FIGS. 1–2, wherein two block diagrams illustrating a topological view of an example network to be managed for a network node in accordance with the present invention, and a method view of the present invention, in accordance with one embodiment, are shown. As illustrated in FIG. 1, example network 100 to be managed for a network node, such as example server 110 includes a number of routing devices 106a–106h coupled to each other and to server 110 as shown, for routing network traffics, including network traffics destined for server 110, such as those originated from clients 108a–108b. Routing devices 106a–106h have different degrees of separation from server 110. Routing devices 106a–106b are said to be one degree separated or removed from server 110, whereas routing devices 106c–106e are two degrees separated or removed from server 110, . . . , and routing devices 106f–106h are n degrees separated or removed from server 110.

Note that the present invention is being described referencing the network node on whose behalf regulation/deregulation is being made, as example server 110, only for ease of understanding. The network node may be a network node of any type, e.g. a point of entry to network 100. Further, routing devices 106f–106h may or may not be contiguous as illustrated.

In accordance with the present invention, example network 110 is also provided with director 102 to manage network traffic routing within network 100 to ensure a desired not-to-exceed network traffic profile of server 110 is adhered to. In one embodiment, the desired not-to-exceed network traffic profile is specified using one or more metrics, and preferably by network traffic types. For example, at most 10% each of the incoming bandwidth to be used for TCP synchronize (SYN) packets and for domain name system (DNS) packets, with remaining incoming bandwidth to be used by other TCP traffic. Additional examples of profile metrics and traffic types are given in the later description to follow.

Director 102 manages network traffic routing within network 100 by regulating and de-regulating network traffic routing by routing devices 106a–106h. Examples of regulation include, but are not limited to, rate limiting the excess traffic, decreasing priority of the excess traffic, and re-routing the excess traffic. Re-routing may involve re-routing through different routing paths or even to different destinations. In one embodiment, regulation is progressively performed based at least in part on the degrees the routing devices are separated from server 100, following in the reverse direction the routing paths traversed by the packets to reach the network node. That is, regulation is progressively applied extending from routing devices 106a–106b with the lowest degree of separation from server 110 to routing devices 106f–106h with the highest degree of separation from server 110, following the "traversed" routing paths in the earlier described reverse manner. In one embodiment, deregulation follows the reverse path of regulation. That is, deregulation is progressively removed from the outermost regulated subset, e.g. routing devices 106c–106e, then the intermediate regulated routing devices, and eventually, the regulated routing devices 106a–106b with the lowest degree of separation from server 110, following the routing paths traversed by the packets to reach the network node. In another embodiment, de-regulation is determined and implemented locally, whenever regulation or the extent of regulation is no longer needed. In one embodiment, the extension and retreat are made at least at the granularity of the interface level, i.e. the ingress and egress interfaces of routing devices 106a–106h. In other words, regulation is first applied to the egress interfaces of a routing device to be regulated, then to the ingress interfaces of these routing devices. Likewise, de-regulation is first made to ingress interfaces of a routing device to be de-regulated, then to the egress interfaces of the regulated routing device to be de-regulated.

In one embodiment, as alluded to earlier, director 102 orchestrates the regulation and de-regulation by network traffic types. That is, different regulation and de-regulation are determined and orchestrated for different network traffic types. In one embodiment, in addition to specifying the "not-to-exceed" limits for the various network traffic types, the desired "not-to-exceed" network traffic profile may also specify the operating margins for each of the network traffic type for regulation/de-regulation to start. For example, in the earlier described example where a 10% "not-to-exceed" limit is specified for TCP SYN packets, an operating margin of 5% may also be specified for initiating regulation/de-regulation, i.e. regulation is to start if the volume of TCP SYN packets has exceeded 9.5% of the network traffic, and de-regulation may begin if the volume falls back below 9.5%. In a preferred embodiment, director 102 is equipped to employ a default operating margin, e.g. 7.5%, if an operating margin is not specified. In other embodiments, a stabilization time period may also be specified before de-regulation starts. For example, network traffic volume for a regulated network traffic type must drop below the regulation threshold for 1 minutes, before de-regulation will start. Employment of such stabilization period has the advantage of preventing "oscillation", i.e. frequent starting of regulation and de-regulation. Preferably, some amount of randomization is also introduced in the selection of T to reduce vulnerabilities to an attacker, who could otherwise predict when deregulation will kick in.

For the illustrated embodiment, example network 100 further includes a number of distributively disposed sensors 104a–104h correspondingly coupled to routing device 106a–106h to monitor and report to director 102 on the network traffic routed through the corresponding routing devices 104a–104h. Director 102 determines and orchestrates the earlier described regulation and optionally, de-regulation, based on the network traffic routing data received, and the earlier described desired "not-to-exceed" network traffic profile of server 110. In one embodiment, sensors 104a–104h are also used to deliver regulation and de-regulation instructions to routing devices 106a–106h for director 102. Distributive regulation of network traffic, including sensors 104a–104h and director 102 in general, is the subject of U.S. application Ser. No. 09/631,898 (Express Mail number EL431186806US), entitled A Distributed Solution for Regulating Network Traffic, filed on Aug. 4, 2000, having at least partial common inventorship with the present invention. The application is hereby fully incorporated by reference.

As described in the incorporated by reference application, in lieu of being externally disposed and correspondingly coupled to routing devices 106a–106h, sensors 104a–104h may monitor and report on the network traffic routed through more than one routing device, as opposed to the corresponding configuration illustrated for ease of understanding. In yet other embodiments, some or all of sensors 104a–104h may be integrally disposed within routing devices 106a–106h instead. Sensors 104a–104h, whether externally disposed or integrally disposed, may be coupled to director 102 using any one of a number of communication links known in the art, such as modem links over conventional phone lines, Digital Subscriber Lines (DSL), Integrated Service Digital Network (ISDN) connections, Asynchronous Transfer Mode (ASM) links, Frame Relay connections, and the like.

In one embodiment, sensors 104a–104h use an access control list (ACL), and commands associated therewith, such as "access-list" and "show access-list" to gather up the relevant data. Similarly, in one embodiment, sensors 104a–104h use interface related commands such as "show interface rate-limit" and "rate-limit" to regulate and de-regulate an interface. These commands, including their operations and constitutions, are known in the art. See product literatures from routing device manufacturers, such as CISCO Systems, Inc of San Jose, Calif.

In alternate embodiments, for certain routing devices, if supported, the relevant data gathered may also include "netflow" data. In other embodiments, the relevant data may also be obtained through known network management services, such as Simple Network Management Protocol (SNMP), Remote Monitoring (RMON) or packet sampling (if one or more of these service are supported by the routing devices).

Example network 100 is intended to represent a broad range of private as well as public networks or interconnected networks, such as the enterprise network of a multi-national corporation, or the Internet. Networking nodes, such as clients 108a–108b and server 110, are also intended to represent a broad range of these elements known in the art. As alluded to earlier, routing devices 106a–106c are intended to represent a broad range of network trafficking equipment, including but not limited to conventional routers, switches, gateways, hubs and the like.

While for ease of understanding, only one director 102, and a handful each of network nodes, clients 108a–108b and server 110, routing devices 106a–106h and sensors 104a–104h (as well as limited numbers of ingress and egress interfaces for routing devices 106a–106h) are included in the illustration, from the description to follow, those skilled in the art will appreciate that the present invention may be practiced with more than one director 102 as well as more or less network nodes, routing devices 106a–106h and sensors 104a–104c (as well as more or less ingress/egress interfaces for routing devices 106a–106h). If more than one director 102 is employed, each director 102 may be assigned responsibility for a subset of sensors 104a–104h, and the directors may relate to each other in a master/slave relationship, with one of the directors serving as the "master" (and the others as "slave"), or as peers to one another or organized into an hierarchy.

As illustrated in more details in FIG. 2, director 102 is first provided with a desired "not-to-exceed" network traffic profile of server 110, and a topology and routing map of network 100, block 202. In addition to the earlier described bandwidth metric, the "not-to-exceed" network traffic profile of server 110 may also be specified using metrics such as the number of bits per second (mbps), the number of packets per second, or the number of flows per second for each network traffic type to be regulated. The topology and routing map may be defined and specified by information technology (ITU) professionals associated with server 110 using any one of a number of techniques known in the art. In alternate embodiments, the topology and routing map may be constructed by director 102 instead (as opposed to having the map provided to director 102). Director 102 may enumerate the map by e.g. sampling routing paths of network traffics destined for server 110, identifying the routing paths and the routing devices through which the network traffics are routed. At block 204, director 102 receives network traffic reports on the network traffic routed through routing devices 106a–106h. For the illustrated embodiments, the reports are provided by distributively disposed sensors 104a–104h. In one embodiment, the reported data include various statistics and "characteristic" information describing the network traffic routed through the ingress/egress interfaces of routing devices 106a–106h. In one embodiment, the reported data include destination information, allowing the amount of network traffic destined for server 110 be discernable. In one embodiment, the reported data include network traffic types, allowing the type of network traffic be discernable. In addition to the aforementioned TCP SYN and DSN packets, network traffic types may further include Web, Real Networks, Secure Web, Other TCP, Other user datagram protocol (UDP), internet control message protocol (ICMP), TCP packets with acknowledge (ACK) set, TCP packets without SYN set, and so forth. In general, any information carried as part of the packets may be used as typing criteria to divide the network traffic into different traffic types. Additionally, the reported data may also include volume of data from specific source addresses passing through a routing device, volume of data with specific source and destination address combinations, lengths of packets, distribution of Time To Live values, and so forth, i.e. whatever data are necessary to support the employment of the desired "not-to-exceed" metrics.

At block 206, in response to the receipt of the reported data, director 102 automatically determines whether network traffic routing in network 100 needs to be (further) regulated or de-regulated (using the received data, and the limits and operating margins specified in the earlier described desired "not-to-exceed" network traffic profile). As described earlier, in accordance with one aspect of the present invention, regulation/de-regulation is advantageously performed in a progressive manner, thus if regulation (or further regulation) is needed, at block 208, director 102 determines the regulation to be imposed on the routing devices of the next degree of separation (along the reverse direction the routing paths traversed by the packets to reach the network node). That is, if no regulation is in effect for any routing devices, regulation is determined for routing devices 106a–106b with one degree of separation from server 110 (along the traversed routing paths). As alluded to earlier, in one embodiment, regulation is determined at the granularity of the interface level, i.e. the egress interfaces of routing devices 106a–106b. However, if e.g. regulation is already in effect on both the ingress and egress interfaces of routing devices 106a–106b, further regulation is determined for routing devices 106c–106e with two degrees of separation from server 110. Again, in one embodiment, regulation is determined for the egress interfaces of routing devices 106c, 106d and/or 106e.

On the other hand, for the illustrated embodiment, if de-regulation (or further de-regulation) is needed, at block 210, director 102 determines de-regulation for the "outermost" regulated subset. That is, if routing devices 106c–106e (more specifically, their egress interfaces) are the farthest removed (interfaces of routing devices from server 110 being regulated, director 102 determines de-regulation for (the egress interfaces on routing devices 106c, 106d, and/or 106e. However, if regulation has only been extended to (the egress interfaces of) routing devices 106a–106b, director 102 determines de-regulation for (the egress interfaces of) routing devices 106a and/or 106b instead. Recall from earlier description, in alternate embodiments, de-regulation may be determined locally instead, and regulation may be moderated or lifted as soon as regulation is no longer needed, or the extent of regulation is not needed.

In one embodiment, regulation involves apportioning the bandwidth of a "downstream" interface to its "upstream" interfaces, whereas de-regulation involves removal of the bandwidth limitation imposed on an interface. In one embodiment, removal of imposed bandwidth limitation may be performed in multiple iterations. For example, if an ingress interface of server 110 has a bandwidth of z Mbps (for a network traffic type), and the two links feeding this ingress interface from the egress interfaces of routing devices 106a and 106b may allocate up to $y_1$ and $y_2$ Mbps respectively (for the network traffic type), the egress interfaces of routing devices 106a and 106b are rate limited to $z \times y_1/(y_1+y_2)$ and $z \times y_2/(y_1+y_2)$ Mbps respectively (for the network traffic type). In alternate embodiments, other manners of allocating bandwidth limitation (for a network traffic type), as well as other forms of regulation, such as the earlier mentioned rate limiting, priority decreasing, and routing, may be practiced instead. For the purpose of this application, "downstream" refers to the network traffic flow direction towards server 110, whereas "upstream" refers to the network traffic flow direction away from server 110.

Those skilled in the art will appreciate that the present invention is a superior approach to the prior art approach of regulating network traffic at the network node of interest, using e.g. a firewall.

For example, the present invention is particularly useful in protecting a network node from denial of service (DoS) attacks by regulating/limiting attack traffic within the network, so that it minimally interferes with the legitimate or desirable traffic. The present invention is also particularly useful in averting "success disaster", by causing load shedding of a particular type of network traffic, e.g. TCP SYN, to avoid the appearance of a flash crowd at a network node, and to protect a network node from collateral damages caused by attacks on another network node.

At block 212, director 102 issues the regulation/de-regulation instructions to routing devices 106a–106h to be regulated/de-regulated. For the illustrated embodiment, the regulation/de-regulation instructions are issued to the responsible ones of sensors 104a–104c, for "application" to routing devices 106a–106h.

Director

Figure 3:
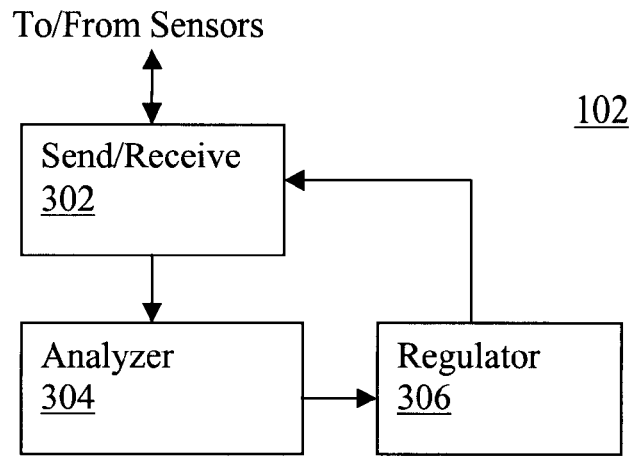
FIG. 3 illustrates a functional view of the director of FIG. 1, in accordance with one embodiment.

Referring now to FIG. 3, wherein a functional view of the director, in accordance with one embodiment is shown. As illustrated, director 102 includes send/receive function 302, analyzer 304, and regulator 306, operatively coupled to each other as shown. Send/receive function 302 is employed to receive network traffic data (e.g. reported by the distributively disposed sensors), and to send regulation/de-regulation instructions to the routing devices to be regulated (e.g. through the distributively disposed sensors). Analyzer 304 analyzes the network traffic data reported (in view of the desired "not-to-exceed" profile of server 110) to determine if regulation/de-regulation actions need to be taken, and alerts regulator 306 accordingly. Regulator 306 is used to determine the specific progressive regulation/de-regulation actions to be taken.

Figure 4:
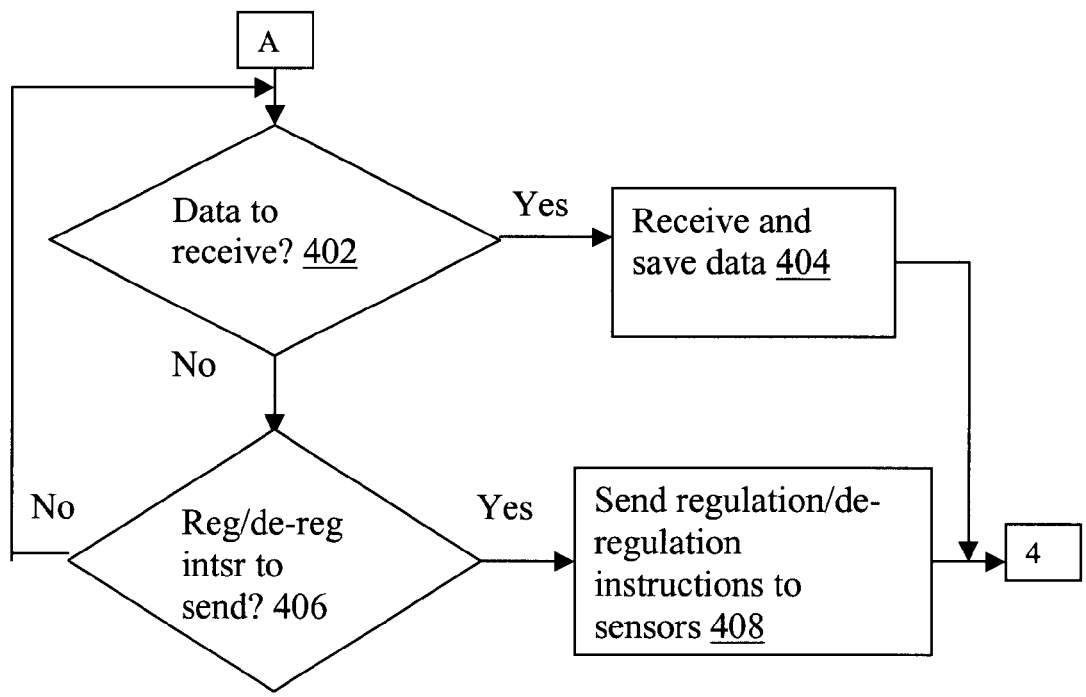
FIGS. 4–6 illustrate the operational flow of the relevant aspects of the send/receive analyzer and regulator functions of FIG. 3, in accordance with one embodiment each
Figure 5:
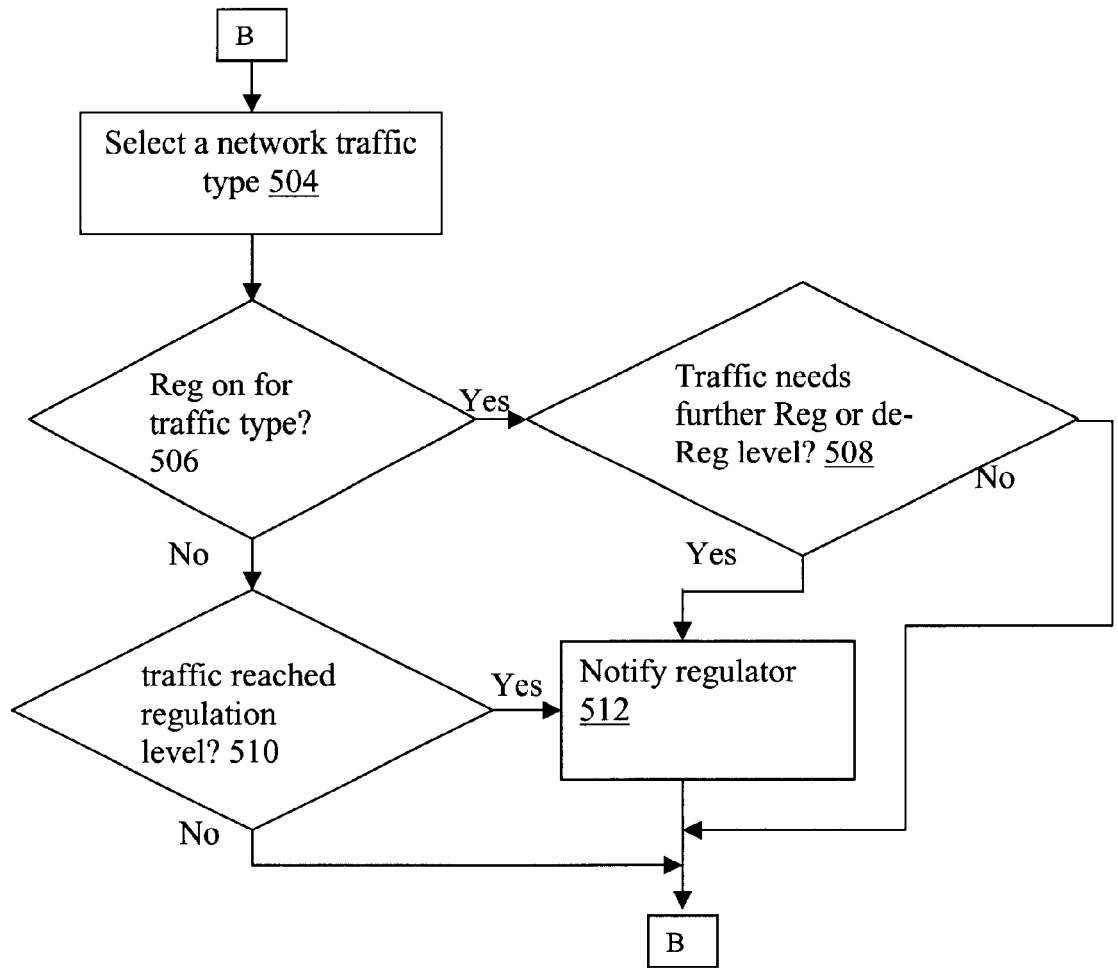
Figure 6:
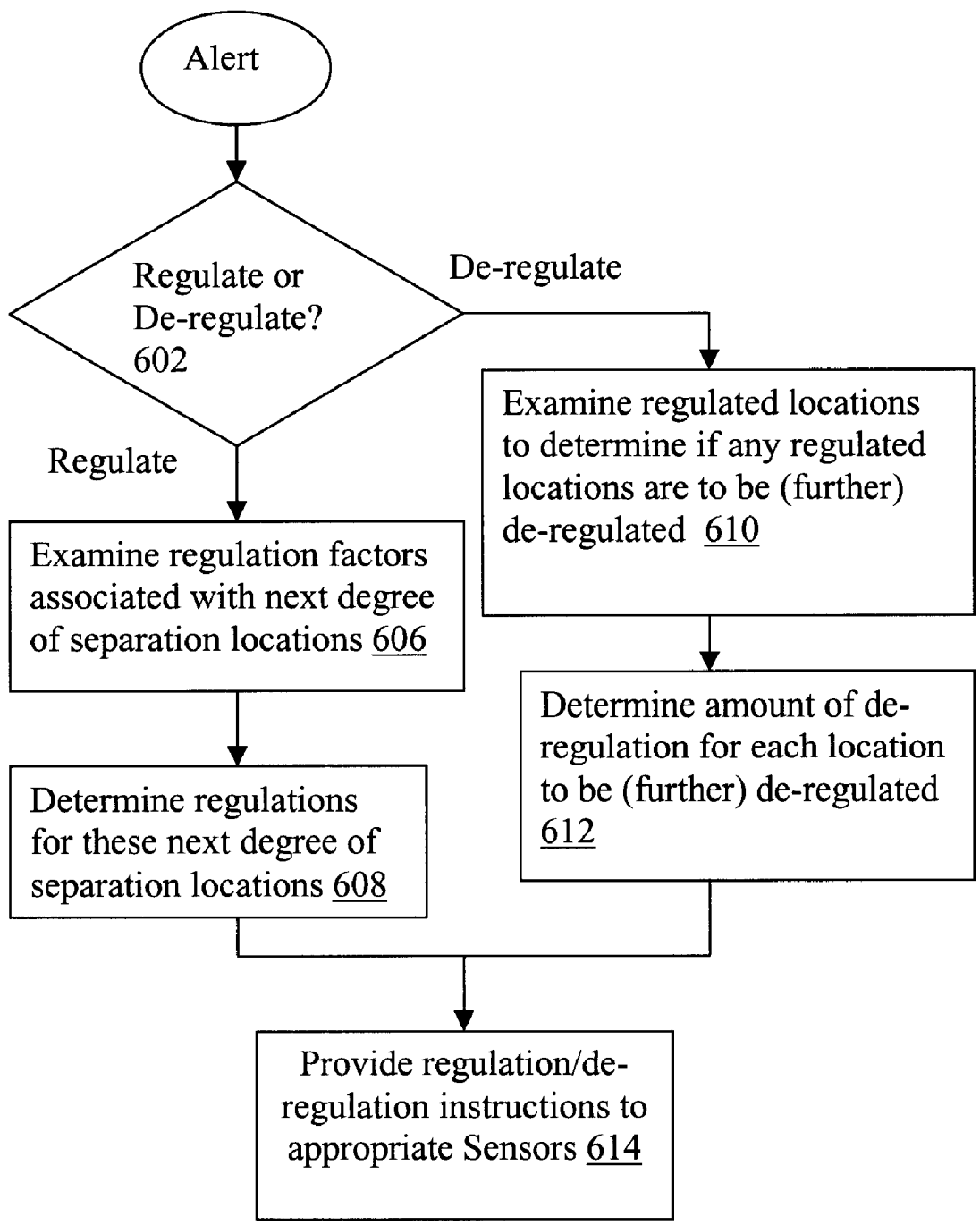

FIGS. 4–6 illustrate the operational flow of the relevant aspects of the send/receive, analyzer and regulation functions 302–306, in accordance with one embodiment each. As illustrated in FIG. 4, for the send/receive function, upon start up, it determines if there are network traffic data to be received (e.g. from the distributively disposed sensors), block 402. If there are, send/receive function 302 receives the network traffic data being reported accordingly. If there are not, send/receive function 302 determines if there are regulation/de-regulation instructions to be sent (e.g. to the distributively disposed sensors). If there are, send/receive function 302 sends the regulation/regulation instructions accordingly. If there are not, send/receive function 302 returns to block 402 to determine if there are data to be received again.

As illustrated in FIG. 5, upon start up, analyzer 304 selects a network traffic type to be monitored, block 504. Analyzer 304 further determines if regulations are being administered for the network traffic type, block 506. If network traffics of the particular type destined for server 110 are being regulated, analyzer 304 further determines if the network traffics of the particular type are still exceeding the margin of the "not-to-exceed" limit (i.e. further regulation is needed), or the network traffics of the particular type have fallen back below the margin of the "not-to-exceed" limit (for a specified stabilization period), i.e. de-regulation may start, block 508. If network traffics of the particular type are adhering to the desired "not-to-exceed" profile (but not fallen below the operating margin), no actions are taken. If the network traffics of the particular type remain non-adhering to the desired "not-to-exceed" profile or have fallen below the operating margin of the "not-to-exceed" limit (for the required stabilization duration), analyzer 304 notifies/alerts regulator 306 accordingly, block 512. Back at block 506, if regulation is not in progress, analyzer 310 determines if network traffics of the particular type have exceeded the margin of the "not-to-exceed" limit, 508. If network traffics of the particular type have not reached or surpassed the margin of the "not-to-exceed" limit, no actions are taken. If network traffics of the particular type have reached or surpassed the margin of the "not-to-exceed" limit, analyzer 304 notifies/alerts regulator 306 accordingly, block 512.

Analyzer 304 repeats this process for each network traffic type to be regulated for server 110.

As illustrated in FIG. 6, upon receipt of an alert, regulator 306 determines if the alert is for (further) regulation or de-regulation, block 602. If the alert is for (further) regulation, regulator 306 examines the regulation metrics (e.g. bandwidths or mbps, etc.) of the next upstream set (of interfaces) of the routing devices, block 606. Further, regulator 306 determines the regulation (e.g. bandwidth allocation, rate limiting etc.), block 608. Upon making these determinations, regulator 306 provides the regulation instructions to the routing devices to be regulated accordingly (e.g. through the sensors), block 614. On the other hand, if the alert is for de-regulation, regulator 306 selects and examines the outermost regulated subset for de-regulation, 610. Further, regulator 306 determines the level of de-regulation (bandwidth restoration, rate limit relaxation etc.), block 612. Upon making these determinations, regulator 306 provides the de-regulation instructions to the routing devices to be de-regulated accordingly (e.g. through the sensors), block 614.

Data Structures

Figures 7A, 7B:
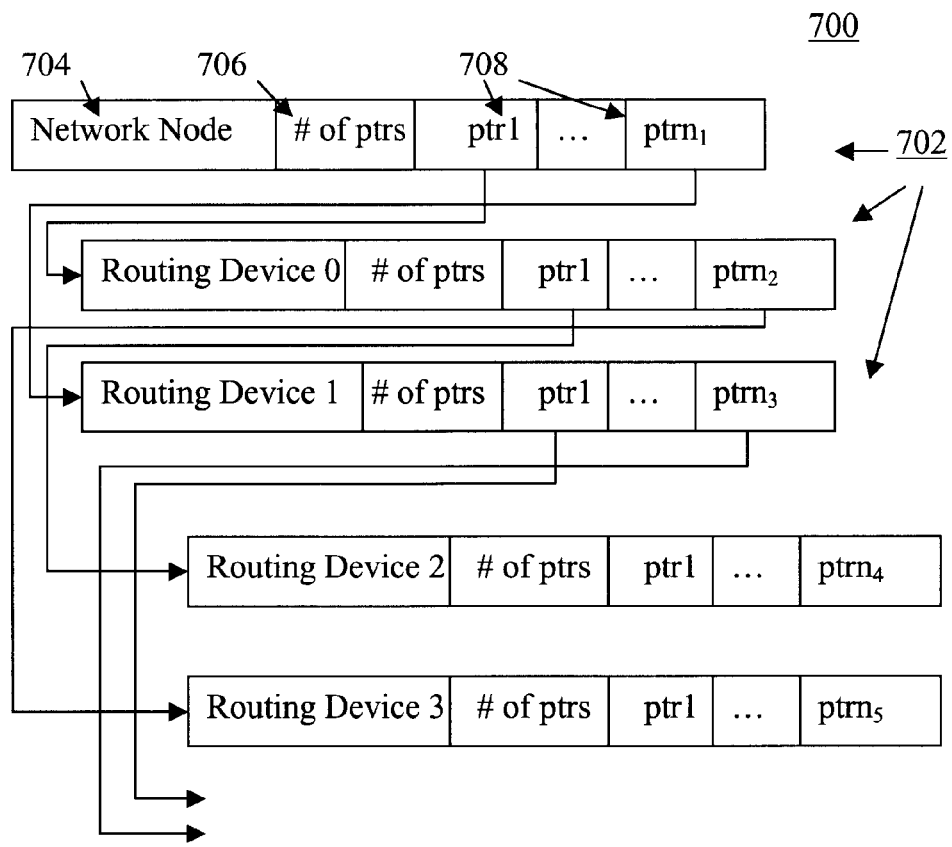
FIGS. 7a–7c illustrate a number of sample data structures suitable for use to practice the present invention for storing the topology and routing map of the network to be managed, the regulation limits imposed on the various routing devices, and the desired not-to-exceed network traffic profile of the network node by network traffic types.
Figures 7C, 8:
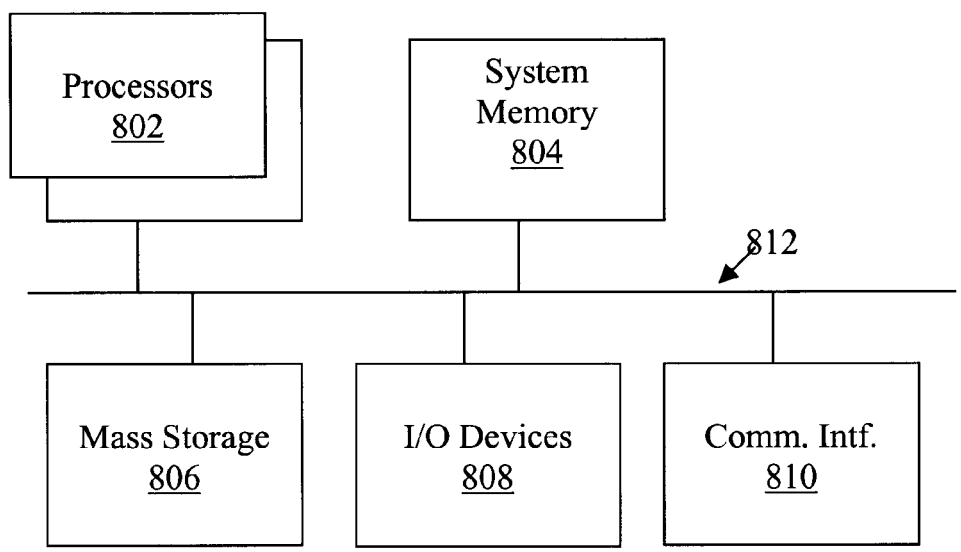
FIG. 8 illustrates an example computer system suitable for use to host a software implementation of a sensor or the director, in accordance with one embodiment.

FIGS. 7a–7c illustrate a number of example data structures suitable for use to store the data associated with the topology map, the desired "not-to-exceed" profile for network traffic type, and the regulation being imposed on the routing devices, for practicing the present invention.

Illustrated in FIG. 7a is example link list 700 enumerating the topology of network 100, by linking together a number of network node/routing device records 702, using pointers 708. For the particular embodiment, the enumeration starts from network node or server 110. A pointer 708 is employed to point to the record 702 of each of the "upstream" (routing) devices. In each record 702, in addition to an identifier 704 of the device, and the pointers 708 to the upstream devices, record 702 also includes a count 706 of the number of upstream devices. In alternate embodiments, other data structures may also be employed to represent the topology of network 100.

Illustrated in FIG. 7c is example table 720 specifying the desired "not-to-exceed" network traffic profile for a number of network traffic types for a number of servers. Table 720 includes a number of columns, in particular, column 722 for storing the identifiers of the servers, on whose behalf, a network is to be regulated. Table 720 further includes column 724 for storing IP addresses of the servers. Table 720 further includes columns 725a–725n and columns 726a–726n for storing the network traffic types, and their corresponding "not-to-exceed" limits, such as TCP SYN packets with a limit of 10%, as described earlier, for the various servers. In different embodiments, additional columns 728 may also be employed to store other related data.

Illustrated in FIG. 7b is example table 710 specifying the regulation in effect for the various interfaces of the routing devices of the network being regulated. Table 710 includes columns 712, 713 and 714 for storing the identifiers of the routing devices, their IP addresses, and identifiers of their ingress/egress interfaces. Table 710 further includes columns 715 and 716a–716n for storing the addresses of the network nodes whose traffics are to be regulated, and the regulations (i.e. bandwidth allocation, rate limit etc.) currently imposed on the various interfaces of the routing devices for the various network traffic types of the network nodes. In different embodiments, additional columns 718 may also be employed to store other related data.

In general, as those skilled in the art would appreciate, in alternate embodiments, other equivalent data structures may also be employed to store these data to practice the present invention.

Example Host Computer System

FIG. 8 illustrates an example computer system suitable for use as either a host to a software implementation of a sensor, or the director in accordance with one embodiment. As shown, computer system 800 includes one or more processors 802 (typically depending on whether it is used as host to sensor or the director), and system memory 804. Additionally, computer system 800 includes mass storage devices 806 (such as diskette, hard drive, CDROM and so forth), input/output devices 808 (such as keyboard, cursor control and so forth) and communication interfaces 810 (such as network interface cards, modems and so forth). The elements are coupled to each other via system bus 812, which represents one or more buses. In the case of multiple buses, they are bridged by one or more bus bridges (not shown). Each of these elements performs its conventional function s known in the art. In particular, system memory 804 and mass storage 806 are employed to store a working copy and a permanent copy of the programming instructions implementing the sensor/director teachings of the present invention. The permanent copy of the programming instructions may be loaded into mass storage 806 in the factory, or in the field, as described earlier, through a distribution medium (not shown) or through communication interface 810 (from a distribution server (not shown). The constitution of these elements 802–812 are known, and accordingly will not be further described.

Conclusion and Epilogue

Thus, it can be seen from the above descriptions, a novel method and apparatus for progressively and distributively regulating and de-regulating selected network traffic destined for a network node has been described. The novel scheme enables the quality of service provided by the network to the network node and its clients to be ensured, including nullification of denial of service attacks.

While the present invention has been described in terms of the above illustrated embodiments, those skilled in the art will recognize that the invention is not limited to the embodiments described. The present invention can be practiced with modification and alteration within the spirit and scope of the appended claims. For examples, as alluded to earlier, the present invention may be practiced with more or less sensors, more directors, and so forth. Thus, the description is thus to be regarded as illustrative instead of restrictive on the present invention.

What is claimed is:

1. A network comprising:
    a network node;
    a plurality of routing devices of one or more degrees of separation from said network node to route network traffics, including routing network traffics destined for said network node; and
    a director coupled to said routing devices that, in response to a denial of service attack on said network node, progressively regulates network traffic routing by said routing devices based at least in part on their degrees of separation from said network node.

2. The network of claim 1, wherein the director is equipped to determine if routing of network traffic by said routing devices: needs to be regulated; or, if regulation is already in progress, needs a change in the regulation.

3. The network of claim 1, wherein the director is equipped to progressively regulate said routing devices, starting with a nearest subset of said routing devices, with the lowest degree of separation from said network node, and extending to a farthest subset of said routing devices, with the highest degree of separation from said network node, following in a reverse manner routing paths traversed by the network traffic to reach the network node.

4. The network of claim 3, wherein the director is equipped to regulate said routing devices through at least a selected one of bandwidth allocation, rate limiting, traffic re-prioritization, and re-routing.

5. The network of claim 3, wherein the director is equipped to regulate a subset of routing devices with n degrees of separation from said network node by apportioning a network traffic bandwidth of a routing device with n−1 degree of separation from said network node, and allocating the apportioned bandwidth to routing devices of said subset with n degrees of separation from said network node, which are to in turn route network traffic destined for said network node in accordance with the allocated bandwidth.

6. The network of claim 3, wherein the director is also to progressively de-regulate network traffic routing by said routing devices based at least in part on their degrees of separation from said network node, following a reverse path of said progressive regulation.

7. The network of claim 6, wherein the director is equipped to determine if regulation imposed on routing of network traffic by said routing devices needs to be de-regulated.

8. The network of claim 6, wherein the director is equipped to progressively de-regulate regulation imposed on said routing devices, starting with a current outermost subset of said routing devices, with the highest degree of separation from said network node among the routing devices being regulated, and retreating to the nearest subset of said routing devices, with the lowest degree of separation from said network node.

9. The network of claim 8, wherein the director is equipped to de-regulate at least a selected one of bandwidth allocation, rate limiting, traffic re-prioritization, and re-routing regulation imposed.

10. A network comprising:
a network node;
a plurality of routing devices of one or more degrees of separation from said network node to route network traffics including routing network traffics destined for said network node; and
a director coupled to said routing devices to progressively regulate network traffic routing by said routing devices based at least in part on their degrees of separation from said network node;
wherein the director is equipped to progressively regulate said routing devices, starting with a nearest subset of said routing devices, with the lowest degree of separation from said network node, and extending to a farthest subset of said routing devices, with the highest degree of separation from said network node, following in a reverse manner routine paths traversed by the network traffic to reach the network node;
wherein the director is also to progressively de-regulate network traffic routing by said routing devices based at least in part on their degrees of separation from said network node, following a reverse path of said progressive regulation;
wherein the director is equipped to progressively de-regulate regulation imposed on said routing devices, starting with a current outermost subset of said routing devices, with the highest degree of separation from said network node among the routing devices being regulated, and retreating to the nearest subset of said routing devices, with the lowest degree of separation from said network node; and
wherein the director is equipped to de-regulate regulation imposed on a routing device of said current outermost subset of routing devices with the highest degree of separation from said network node among routing devices being regulated, by lifting a network traffic bandwidth limit imposed on said routing device of the outermost subset for routing network traffic destined to said network node.

11. The network of claim 1, wherein the director further bases said progressive regulation of network traffic routing by said routing device on network traffic type of the network traffic destined for said network node.

12. The network of claim 11, wherein the director further bases said progressive regulation of network traffic routing by said routing devices on a desired not-to-exceed profile of network traffic by network traffic type to be routed to said network node.

13. The network of claim 1, wherein the network further comprises a plurality of sensors selectively coupled to said routing devices or integrated with said routing devices to provide network traffic routing data of said routing devices to said director to facilitate said progressive regulation of said routing devices, the coupled sensors being also coupled to said director.

14. A method comprising:
receiving network traffic data describing network traffic routed through a plurality of routing devices with one or more degrees of separation from a network node, including at least network traffic data for network traffic destined for said network node routed by said routing devices to said network node; and
progressively regulating network traffic routing, in response to a denial of service attack on said network node, by said routing devices based at least in part on said received network traffic data and said degrees of separation of said routing devices from said network node.

15. The method of claim 14, wherein said progressive regulation comprises determining if routing of network traffic by said routing devices: needs to be regulated; or, if regulation is already in progress, needs a change in the regulation.

16. The method of claim 14, wherein said progressive regulation comprises progressively regulating said routing devices, starting with a nearest subset of said routing devices, with the lowest degree of separation from said network node, and extending to a farthest subset of said routing devices, with the highest degree of separation from said network node, following in a reverse manner routing paths traversed by said network traffic to reach said network node.

17. The method of claim 16, wherein said progressive regulation comprises regulating said routing devices through at least a selected one of bandwidth allocation, rate limiting, traffic re-prioritization, and re-routing.

18. The method of claim 16, wherein said progressive regulation comprises regulating a subset of routing devices with n degrees of separation from said network node by apportioning a network traffic bandwidth of a routing device with n−1 degree of separation from said network node, and allocating the apportioned bandwidth to routing devices of said subset with n degrees of separation from said network node, which are to in turn route network traffic destined for said network node in accordance with the allocated bandwidth.

19. The method of claim 14, wherein the method further comprises progressively de-regulating network traffic routing by said routing devices based at least in part on their degrees of separation from said network node, following a reverse part of said progressive regulation.

20. The method of claim 19, wherein said progressive de-regulation comprises determining if regulation imposed on routing of network traffic by said routing devices needs to be de-regulated.

21. The method of claim 19, wherein said progressive de-regulation comprises progressively de-regulating regulation imposed on said routing devices, starting with a current outermost subset of said routing devices, with the highest degree of separation from said network node among the routing devices being regulated, and retreating to the nearest subset of said routing devices, with the lowest degree of separation from said network node.

22. The method of claim 21, wherein said progressive de-regulation comprises de-regulating at least a selected one of bandwidth allocation, rate limiting, traffic re-prioritization and re-routing regulation imposed.

23. A method comprising:
receiving network traffic data describing network traffic routed through a plurality of routing devices with one or more degrees of separation from a network node, including at least network traffic data for network traffic destined for said network node routed by said routine devices to said network node; and
progressively regulating network traffic routing by said routing devices based at least in part on said received network traffic data and said degrees of separation of said routing devices from said network node;
wherein the method further comprises progressively de-regulating network traffic routing by said routing devices based at least in part on their degrees of separation from said network node, following a reverse part of said progressive regulation;
wherein said progressive de-regulation comprises progressively de-regulating regulation imposed on said routing devices, starting with a current outermost subset of said routing devices with the highest degree of separation from said network node among the routing devices being regulated, and retreating to the nearest subset of said routing devices, with the lowest degree of separation from said network node; and
wherein said progressive de-regulation comprises de-regulating regulation imposed on a routing device of said current outermost subset of routing devices with the highest degree of separation from said network node among routing devices being regulated, by lifting a network traffic bandwidth limit imposed on said routing device of the outermost subset for routing network traffic destined to said network node.

24. The method of claim 14, wherein said progressive regulation of network traffic routing by said routing devices is to be performed further based on network traffic types of the network traffic destined for said network node.

25. The method of claim 24, wherein said progressive regulation of network traffic routing by said routing devices is to be performed further based on a desired not-to-exceed profile of network traffic by network traffic types to be routed to said network node.

26. The method of claim 14, wherein said receiving comprises receiving network traffic routing data of said routing devices from a plurality of sensors selectively coupled to said routing devices or integrated with said routing devices.

27. A method comprising:
receiving network traffic reports, including network traffic type information, for network traffic routed through a plurality of routing devices and destined for a network node; and
progressively regulating network traffic routing, based at least in part on degrees of separation from said network node, in response to a denial of service attack on said network node, by network traffic type by said routing devices based at least in part on said received network traffic reports and said network traffic type information.

28. The method of claim 27, wherein said regulating comprises determining if routing of network traffic of a network traffic type by said routing devices needs: needs to be regulated; or, if regulation is already in progress, needs a change in the regulation.

29. The method of claim 27, wherein said regulating comprises regulating said routing devices through at least a selected one of bandwidth allocation, rate limiting, traffic re-prioritization, and re-routing.

30. The method of claim 27, wherein the method further comprises de-regulating network traffic routing by network traffic types by said routing devices based at least in part on said received network traffic data by network traffic types.

31. The method of claim 30, wherein said de-regulating comprises determining if regulation imposed on routing of network traffic of a network traffic type by said routing devices needs to be de-regulated.

32. The method of claim 30, wherein said de-regulation comprises de-regulating at least a selected one of bandwidth allocation, rate limiting, traffic re-prioritization, and re-routing regulation imposed.

33. The method of claim 27, wherein said regulating of network traffic routing by network traffic type by said routing devices is to be performed further based on a desired not-to-exceed profile of network traffic by network traffic type to be routed to said network node.

34. An apparatus comprising:
(a) storage medium having stored therein a plurality of programming instructions designed to enable the apparatus to receive network traffic data describing network traffic routed through a plurality of routing devices with one or more degrees of separation from a network node, including at least network traffic data for network traffic destined for said network node routed by said routing devices to said network node, and to progressively regulate network traffic routing by said routing devices, in response to a denial of service attack on said network node, based at least in part on said received network traffic data and said degrees of separation of said routing devices from said network node; and
(b) at least one processor coupled the storage medium to execute the programming instructions.

35. The apparatus of claim 34, wherein said programming instructions enable the apparatus to determine if routing of network traffic by said routing devices needs: needs to be regulated; or, if regulation is already in progress, needs a change in the regulation.

36. The apparatus of claim 34, wherein said programming instructions enable the apparatus to progressive regulating said routing devices, starting with a nearest subset of said routing devices, with the lowest degree of separation from said network node, and extending to a farthest subset of said routing devices, with the highest degree of separation from said network node, following in a reverse manner routing paths traversed by said network traffic to reach said network node.

37. The apparatus of claim 36, wherein said programming instructions enable the apparatus to regulate said routing devices through at least a selected one of bandwidth allocation, rate limiting, traffic re-prioritization, and re-routing.

38. The apparatus of claim 37, wherein said programming instructions enable the apparatus to regulate a subset of routing devices with n degrees of separation from said network node by apportioning a network traffic bandwidth of a routing device with n−1 degree of separation from said network node, and allocating the apportioned bandwidth to routing devices of said subset with n degrees of separation from said network node, which are to in turn route network, traffic destined for said network node in accordance with the allocated bandwidth.

39. The apparatus of claim 34, wherein said programming instructions further enable the apparatus to progressively de-regulate network traffic routing by said routing devices based at least in part on their degrees of separation from said network node, following a reverse path of said progressive regulation.

40. The apparatus of claim 39, wherein said programming instructions enable the apparatus to determine if regulation imposed on routing of network traffic by said routing devices needs to be de-regulated.

41. The apparatus of claim 39, wherein said programming instructions enable the apparatus to progressively de-regulate regulation imposed on said routing devices, starting with a current outermost subset of said routing devices, with the highest degree of separation from said network node among the routing devices being regulated, and retreating to the nearest subset of said routing devices, with the lowest degree of separation from said network node.

42. The apparatus of claim 41, wherein said programming instructions enable the apparatus to de-regulate at least a selected one of bandwidth allocation, rate limiting, traffic re-prioritization, and re-routing regulation imposed.

43. An apparatus comprising:
(a) storage medium having stored therein a plurality of programming instructions designed to enable the apparatus to receive network traffic data describing network traffic routed through a plurality of routing devices with one or more degrees of separation from a network node, including at least network traffic data for network traffic destined for said network node routed by said routing devices to said network node, and to progressively regulate network traffic routing by said routing devices based at least in part on said received network traffic data and said degrees of separation of said routing devices from said network node; and
(b) at least one processor coupled the storage medium to execute the programming instructions;
wherein said programming instructions further enable the apparatus to progressively de-regulate network traffic routing by said routing devices based at least in part on their degrees of separation from said network node, following a reverse path of said progressive regulation;
wherein said programming instructions enable the apparatus to progressively de-regulate regulation imposed on said routing devices, starting with a current outermost subset of said routing devices, with the highest degree of separation from said network node among the routing devices being regulated, and retreating to the nearest subset of said routing devices, with the lowest degree of separation from said network node; and
wherein said programming instructions enable the apparatus to de-regulate regulation imposed on a routing device of said current outermost subset of routing devices with the highest degree of separation from said network node among routing devices being regulated, by lifting a network traffic bandwidth limit imposed on said routing device of the outermost subset for routing network traffic destined to said network node.

44. The apparatus of claim 34, wherein said programming instructions enable the apparatus to further based said progressive regulation of network traffic routing by said routing devices on network traffic types of the network traffic destined for said network node.

45. The apparatus of claim 44, wherein said programming instructions further enable the apparatus to further base said progressive regulation of network traffic routing by said routing devices on a desired not-to-exceed profile of network traffic by network traffic types to be routed to said network node.

46. The apparatus of claim 34, wherein said programming instructions enable the apparatus to receive said network traffic routing data of said routing devices from a plurality of sensors selectively coupled to said routing devices or integrated with said routing devices.

47. An apparatus comprising:
(a) storage medium having stored therein a plurality of programming instructions designed to enable the apparatus to receive network traffic data by network traffic types for network traffic routed through a plurality of routing devices, including at least network traffic data by network traffic types for network traffic destined for a network node routed by said routing devices to said network node; and to progressively regulate network traffic routing by network traffic types by said routing devices, in response to a denial of service attack on said network node, based at least in part on said received network traffic data by network traffic types and degrees of separation from said network node; and
(b) at least one processor coupled the storage medium to execute the programming instructions.

48. The apparatus of claim 47, wherein said programming instructions enable the apparatus to determine if routing of network traffic of a network traffic type by said routing devices needs: needs to be regulated; or, if regulation is already in progress, needs a change in the regulation.

49. The apparatus of claim 47, wherein said programming instructions enable the apparatus to regulate said routing devices through at least a selected one of bandwidth allocation, rate limiting, traffic re-prioritization, and re-routing.

50. The apparatus of claim 47, wherein said programming instructions further enable the apparatus to de-regulate network traffic routing by network traffic types by said routing devices based at least in part on said received network traffic data by network traffic types.

51. The apparatus of claim 50, wherein said programming instructions enable the apparatus to determine if regulation imposed on routing of network traffic of a network traffic type by said routing devices needs to be de-regulated.

52. The apparatus of claim 50, wherein said programming instructions enable the apparatus to de-regulate at least a selected one of bandwidth allocation, rate limiting, traffic re-prioritization, and re-routing regulation imposed.

53. The apparatus of claim 47, wherein said programming instructions enable the apparatus to further base said regulating of network traffic routing by network traffic type by said routing devices on a desired not-to-exceed profile of network traffic by network traffic type to be routed to said network node.

54. A network comprising:
a network node having a network traffic profile governing a maximum amount of network traffics to be received by the network node;
a plurality of routing devices of one or more degrees of separation from said network node to route network traffics, for routing network traffics destined for said network node; and a director coupled to said routing devices for reducing network traffics routed to said network node in response to said network traffics exceeding the network traffic profile, the director reducing the network traffics by first regulating network traffic routing by said routing devices at lower degrees of separation from said network node and then, if the network traffic profile is still being exceeded, reducing the network traffics by regulating network traffic routing by said routing devices at increasing degrees of separation from said network node.

55. The network of claim 54, wherein the director is equipped to determine if routing of network traffic by said routing devices: needs to be regulated; or, if regulation is already in progress, needs a change in the regulation.

56. The network of claim 54, wherein the director regulates said routing devices, starting with a nearest subset of said routing devices, with the lowest degree of separation from said network node, and extending to a farthest subset of said routing devices, with the highest degree of separation from said network node, following in a reverse manner routing paths traversed by the network traffic to reach the network node.

57. The network of claim 54, wherein the director regulates said routing devices through bandwidth allocation.

58. The network of claim 54, wherein the director regulates said routing devices through rate limiting.

59. The network of claim 54, wherein the director regulates said routing devices through traffic re-prioritization.

60. The network of claim 54, wherein the director regulates said routing devices re-routing.

* * * * *

UNITED STATES PATENT AND TRADEMARK OFFICE
CERTIFICATE OF CORRECTION

PATENT NO. : 6,801,503 B1
DATED : October 5, 2004
INVENTOR(S) : David J. Wetherall et al.

It is certified that error appears in the above-identified patent and that said Letters Patent is hereby corrected as shown below:

Column 11,
Line 47, delete "routine" and insert -- routing --.

Column 13,
Line 19, delete "routine" and insert -- routing --.

Signed and Sealed this

Twenty-first Day of December, 2004

JON W. DUDAS
*Director of the United States Patent and Trademark Office*